Sept. 6, 1927.
M. LITTLE
LOCK NUT
Filed March 16, 1926
1,641,821
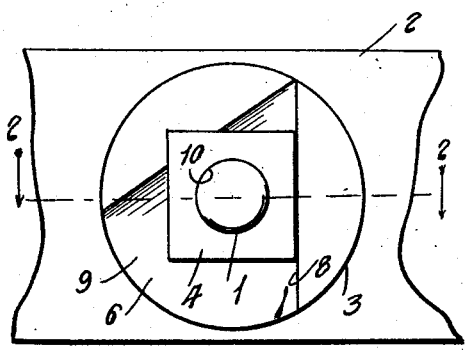
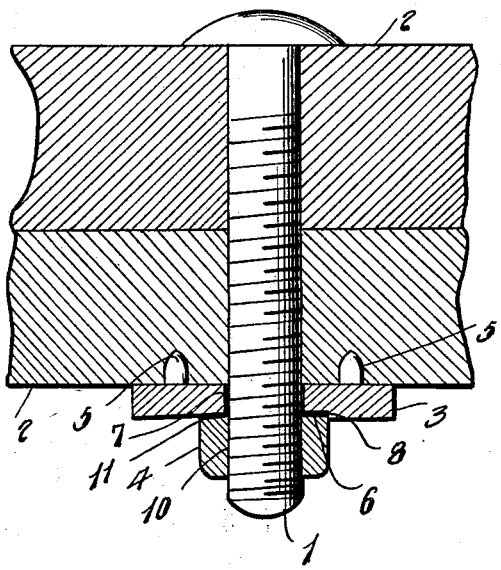
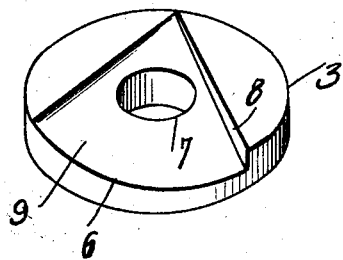
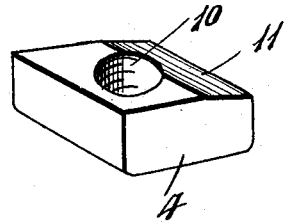
Inventor
M. Little Patented Sept. 6, 1927.

1,641,821

UNITED STATES PATENT OFFICE.

MATHEW LITTLE, OF UNIVERSITY PLACE, NEBRASKA.

LOCK NUT.

Application filed March 16, 1926. Serial No. 95,096.

This invention relates to nut locks, and has for one of its objects the provision of a novel, simple and inexpensive device of this character which shall include a base washer adapted to be locked to one of the members or parts through which the bolt passes and provided with a shoulder extending chordally thereof and adapted to contact with a side of the nut when the latter is fully turned up on the bolt, the engagement thus established between the nut and washer being such as to positively hold the former against casual retrograde movement on the bolt.

With the foregoing and other objects in view, the invention consists of the novel construction, combination and arrangement of parts hereinafter fully described and claimed, and illustrated in the accompanying drawing, wherein:

Figure 1 is an elevational view illustrating the application of the nut lock,

Figure 2 is a sectional view taken on the plane indicated by the line 2—2 of Figure 1, Figure 3 is a detail perspective view of the base washer, and Figure 4 is a similar view of the nut.

Corresponding and like parts are referred to in the following description, and designated in the several views of the accompanying drawing, by similar reference characters.

In the drawing 1 designates a bolt and 2 the members or parts connected or united thereby. A base washer 3 is mounted on the bolt 1 between one of the members or parts 2 and the nut 4. The washer 3 is held against rotation with respect to the bolt 1 by prongs 5 carried thereby and engaging one of the members or parts 2. The washer 3 is provided in its outer face with a recess 6 which is of triangular outline and extends about the bolt receiving opening 7 of the washer. The side wall 8 of the recess 6 provides a shoulder which has a chordal arrangement with respect to the washer 3 and occupies a plane parallel to the axis of the washer. The bottom wall 9 of the recess 6, which opens at its base out through the edge of the washer 3, gradually inclines from the outer face of the washer to the inner longitudinal edge of the shoulder 8 and also gradually inclines from the apex to the base of the recess.

When the nut 4 is fully turned up on the bolt 1 one of its sides contacts with the shoulder 8, as shown in Figure 2. The engagement thus established between the washer 3 and nut 4 is such as to positively hold the latter against casual movement with respect to the bolt 1. To permit the nut 4 to move into the recess 6 and thus contact with the shoulder 8, the base of the nut is beveled at one side of its bolt receiving opening 10 as shown at 11. The instant that the nut 4 reaches its fully turned up position on the bolt 1 it will move into the recess 6 far enough to bring about the necessary contact between one of its sides and the shoulder 8.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What I claim is:—

A nut lock comprising, in combination with a bolt and the part through which it passes, a base washer positioned upon the bolt and provided in its outer face with a triangular recess opening at its base out through the edge of the washer, a side wall of the recess being arranged in a plane parallel to the axis of the washer and extending chordally thereof and the bottom wall of the recess inclining from the other side thereof in the direction of the first mentioned side and from its apex towards its base, a nut mounted on the bolt and having a portion of its base beveled and having one of its sides contacting with said first named side of the recess, and means cooperating with said part and base washer to hold the latter against rotation.

In testimony whereof I affix my signature.

MATHEW LITTLE.